(12) United States Patent
Tolbert, Jr.

(10) Patent No.: US 7,763,808 B2
(45) Date of Patent: Jul. 27, 2010

(54) HERMETIC ELECTRICAL FEEDTHROUGH ASSEMBLY FOR A COMPRESSOR AND METHOD FOR MAKING THE SAME

(75) Inventor: John W. Tolbert, Jr., Bristol, TN (US)

(73) Assignee: Bristol Compressors International, Inc., Bristol, VA (US)

( * ) Notice: Subject to any disclaimer, the term of this patent is extended or adjusted under 35 U.S.C. 154(b) by 365 days.

(21) Appl. No.: 11/894,110

(22) Filed: Aug. 20, 2007

(65) Prior Publication Data

US 2009/0050351 A1 Feb. 26, 2009

(51) Int. Cl.
*H01B 17/26* (2006.01)

(52) U.S. Cl. .................. 174/152 R; 174/650; 174/151; 174/135; 174/77 R; 403/277; 285/95

(58) Field of Classification Search ......... 174/650–657, 174/151, 135, 77 R, 152 R, 554; 285/95, 285/149.1, 286.1; 403/277
See application file for complete search history.

(56) References Cited

U.S. PATENT DOCUMENTS

| | | | | |
|---|---|---|---|---|
| 3,739,076 A | * | 6/1973 | Schwartz | ............ 174/78 |
| 4,454,381 A | * | 6/1984 | Ito et al. | ............ 174/151 |
| 4,549,037 A | * | 10/1985 | Bawa et al. | ............ 174/667 |
| 5,584,716 A | | 12/1996 | Bergman | |
| 6,361,281 B1 | | 3/2002 | Wurth et al. | |
| 6,372,993 B1 | | 4/2002 | Eckels et al. | |
| 6,591,621 B2 | | 7/2003 | Loprete et al. | |
| 6,616,416 B1 | | 9/2003 | Tolbert, Jr. | |
| 6,807,821 B2 | | 10/2004 | Narney, II | |
| 6,901,675 B2 | | 6/2005 | Edwards et al. | |
| 6,971,860 B2 | | 12/2005 | Gilliam et al. | |
| 7,074,022 B2 | | 7/2006 | Majerus et al. | |
| 2007/0022765 A1 | | 2/2007 | Lifson et al. | |
| 2007/0032909 A1 | | 2/2007 | Tolbert et al. | |

FOREIGN PATENT DOCUMENTS

EP 1 724 562 A2 11/2006

OTHER PUBLICATIONS

International Search Report in PCT/US2008/009434 dated Oct. 10, 2008.
Written Opinion in PCT/US2008/009434 dated Oct. 10, 2008.

\* cited by examiner

*Primary Examiner*—Dhiru R Patel
(74) *Attorney, Agent, or Firm*—McNees Wallace & Nurick, LLC

(57) ABSTRACT

An electrical feedthrough assembly for providing connection to components of a compressor. The electrical feedthrough assembly includes a housing having an inner surface defining a channel. A sealed wire assembly is provided in the channel. The sealed wire assembly includes a body having an outer surface defining a groove and a plurality of wires sealingly passing through the body. An o-ring fits in the groove to provide a hermetic seal between the body and the inner surface of the housing.

17 Claims, 5 Drawing Sheets

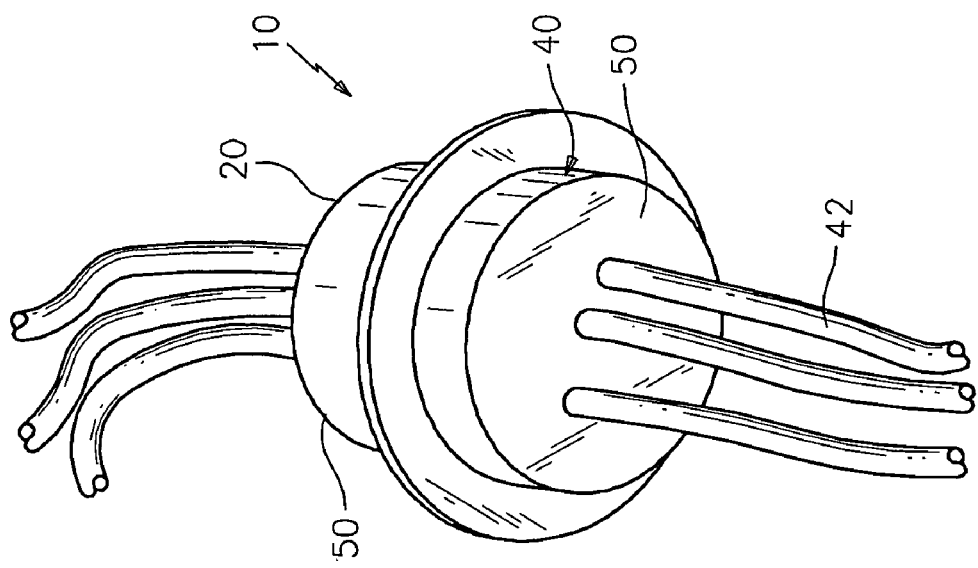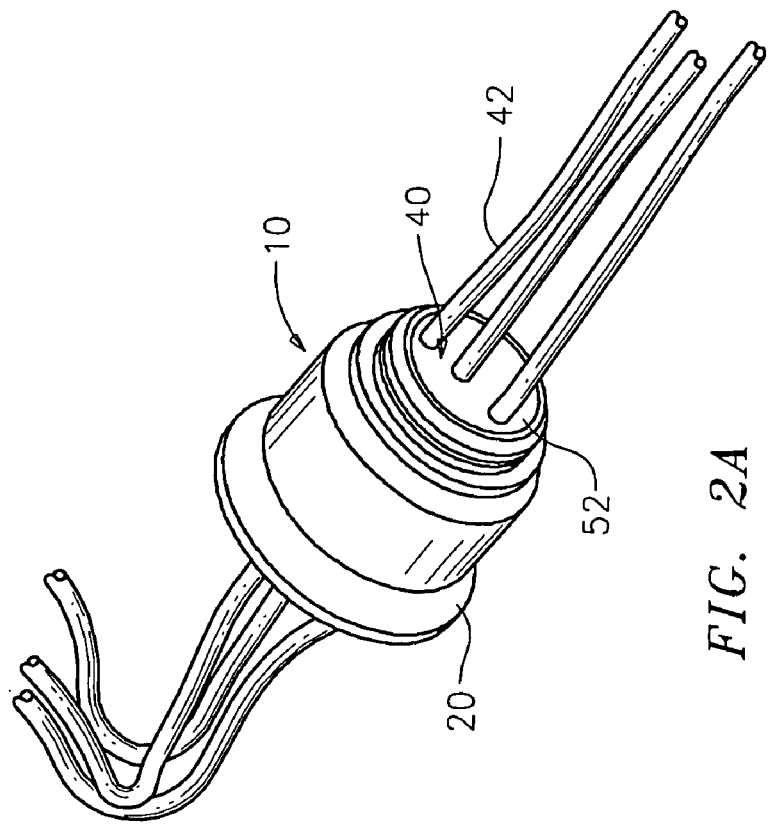

HERMETIC ELECTRICAL FEEDTHROUGH ASSEMBLY FOR A COMPRESSOR AND METHOD FOR MAKING THE SAME

BACKGROUND OF THE INVENTION

1. Field of the Invention

The subject disclosure relates to compressors, and more particularly to an improved method for providing electrical connections to components within the shell or housing of a compressor.

2. Background of the Related Art

Referring to FIG. 1, a top, partial cross-sectional view of a prior art compressor 100 is shown. The compressor 100 has a shell 110 that provides a hermetically sealed environment. Use of electrical components inside the shell 110 has been widely used and well understood in the art. Great care must be taken to insure that the integrity of the hermetically sealed environment is not breached by the electrical connections.

A power terminal 112 facilitates electrical connection into the hermetically sealed environment of the shell 110. The power terminal 112 must maintain the seal while withstanding the harsh operating conditions. The power terminal 112 is disposed within an aperture in the shell 110. The power terminal 112 has a cup-shaped metal collar 126 with a bottom wall. The wall defines holes that conductor pins 128 pass through. The collar 126 is sealed in the shell aperture by welding and the pins 128 are sealed within the collar 126 by fused glass insulation. To further stabilize the terminal 112, the fused glass insulation surrounding the pins 128 is commonly covered with epoxy or shielded by ceramic collars.

A fence 130 surrounds and protects the power terminal 112. A molded plug (not shown) is configured to couple with the fence 130 and, thereby, make an electrical connection with the pins 128 outside the shell 110. To accomplish this connection, the pins 128 are often provided with a tab (not shown). A similar plug, tabs or wires must be provided on the inner end of the pins 128 to accomplish electrical connection between the compressor component and the power terminal 112.

There are problems associated with sealed glass pin power terminals 112. The terminals 112 require extensive tooling that is costly and not easily modified to add or subtract pins 128. This prefabrication process is costly, complex and time consuming. As the terminals 112 are being welded to the shells 110, the glass seals are often damaged and, thus, the assembly 120 must be scraped and replaced. This is quite costly as significant time and expense has already been invested in pre-assembling the power terminal 112. Even worse, damaged glass seals go undetected, creating eventual compressor failure. Further, it is common for the plug and, in turn, electrical connections to become loose resulting in compressor failure. These additional parts and complexity to connect to the pins 128 adds cost and creates additional junctions that may fail. For other examples, see U.S. Pat. Nos. 6,971,860; 6,372,993; 5,584,716; 5,762,479; 5,538,404; 5,281,105; 4,729,723; 4,412,791; 4,406,590; 4,396,360; 4,384,635; and 4,239,461.

There is a need, therefore, for an improved assembly and method of making the assembly which permits easy internal and external electrical connections with the hermetically sealed environment within a compressor shell and aids in assuring reliable performance while being cost effective.

SUMMARY OF THE INVENTION

It is an object of the subject technology to provide an electrical assembly that can effectively provide connection to compressor components yet maintain the integrity of the compressor shell through harsh conditions such as swings in vacuum and pressure.

It is another object of the subject technology to simplify assembly of compressors and the compressor components by eliminating the glass sealed power terminal. It is another object of the subject technology to provide an electrical feedthrough assembly that can accommodate modifications such as additional wires.

The present invention is directed to an electrical feedthrough assembly for providing connection to components of a compressor. The electrical feedthrough assembly includes a housing having an inner surface defining a channel. A sealed wire assembly is provided in the channel. The sealed wire assembly includes a body having an outer surface defining at least one groove and a plurality of wires sealingly passing through the body. An o-ring fits in the groove(s) to provide a hermetic seal between the body and the inner surface of the housing.

Another embodiment is directed to a compressor including a shell defining an opening. A weld housing has an outer surface hermetically welded in the opening. The weld housing forms an elongated channel to hold a sealed wire assembly. The sealed wire assembly includes a body having an outer surface defining a groove and wires sealingly passing through the body. An o-ring is disposed in the groove to provide a hermetic seal between the body and the weld housing.

Still another embodiment of the present invention includes a compressor including a shell defining an opening and a wire assembly hermetically sealed in the opening. The wire assembly includes a body and wires passing through the body, wherein the body is an epoxy material that hermetically seals the wires directly therein without additional components. Preferably, the body has an outer surface defining at least one groove that receives an o-ring. Additionally, the compressor may have a housing with an outer surface hermetically secured to the opening and an inner surface defining an elongated channel for receiving the wire assembly.

It should be appreciated that the present invention can be implemented and utilized in numerous ways, including without limitation as a process, an apparatus, a system, a device, and a method for applications now known and later developed. These and other unique features of the embodiments disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

FIG. 2A is an outer perspective view of an electrical feedthrough assembly for a compressor in accordance with the subject technology.

FIG. 2B is an inner perspective view of an electrical feedthrough assembly for a compressor in accordance with the subject technology.

DETAILED DESCRIPTION OF PREFERRED EMBODIMENTS

Figure 1:
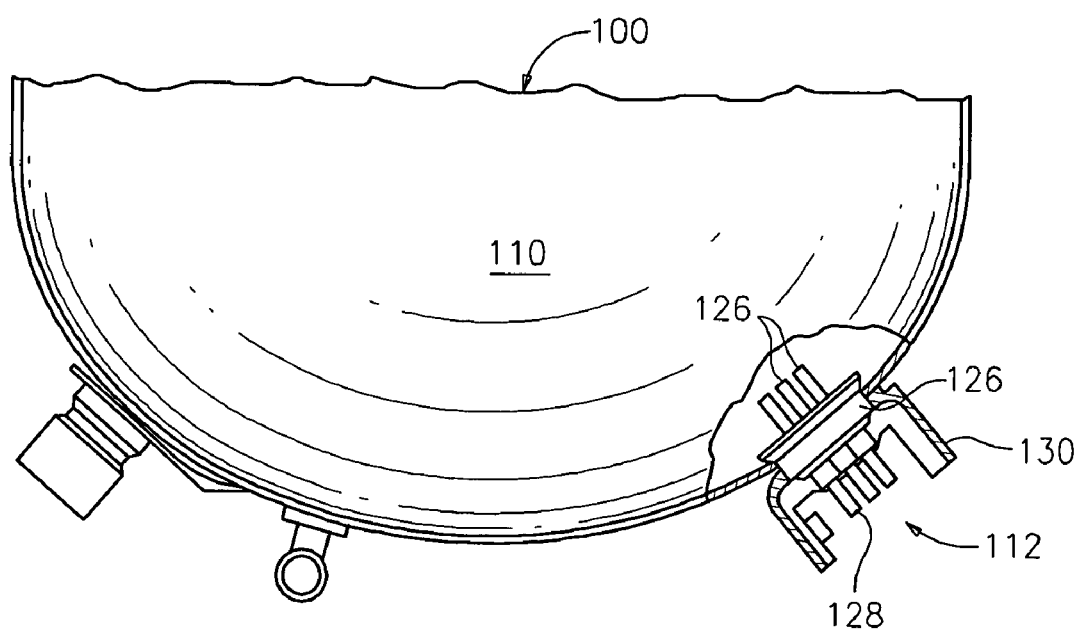
FIG. 1 is a top, partial cross-sectional view of a prior art compressor.

The present invention overcomes many of the prior art problems associated with providing electrical connections to components within the shell of a compressor. The advantages, and other features of the technology disclosed herein, will become more readily apparent to those having ordinary skill in the art from the following detailed description of certain preferred embodiments taken in conjunction with the drawings which set forth representative embodiments of the present invention and wherein like reference numerals identify similar structural elements whenever possible.

All relative descriptions herein such as above, below, left, right, up, and down are with reference to the Figures, and not meant in a limiting sense. Relative descriptions such as inner and inward are with reference to being a direction toward the interior of a compressor shell whereas outer and outward are a direction away from the compressor. The illustrated feedthrough assemblies can be understood as providing exemplary features of varying detail of certain embodiments, and therefore, components, modules, elements, and/or aspects of the illustrations can be otherwise added to, combined, interconnected, sequenced, separated, interchanged, positioned, and/or rearranged without materially departing from the disclosed systems or methods. Additionally, the shapes and sizes of components are also exemplary and unless otherwise specified, can be altered without materially affecting or limiting the disclosed technology.

Referring to FIGS. 2A and 2B, outer and inner perspective views, respectively, of an electrical feedthrough assembly 10 for a compressor in accordance with the subject technology are shown. In brief overview, the feedthrough assembly 10 includes a weld housing 20 sealingly retaining a sealed wire assembly 40. The outer surface of the weld housing 20 is hermetically welded within an opening of a compressor shell (not shown). A plurality of wires 42 extend through the wire assembly 40 to interconnect electrical components within the compressor shell with electrical components outside the compressor shell.

Figure 3:
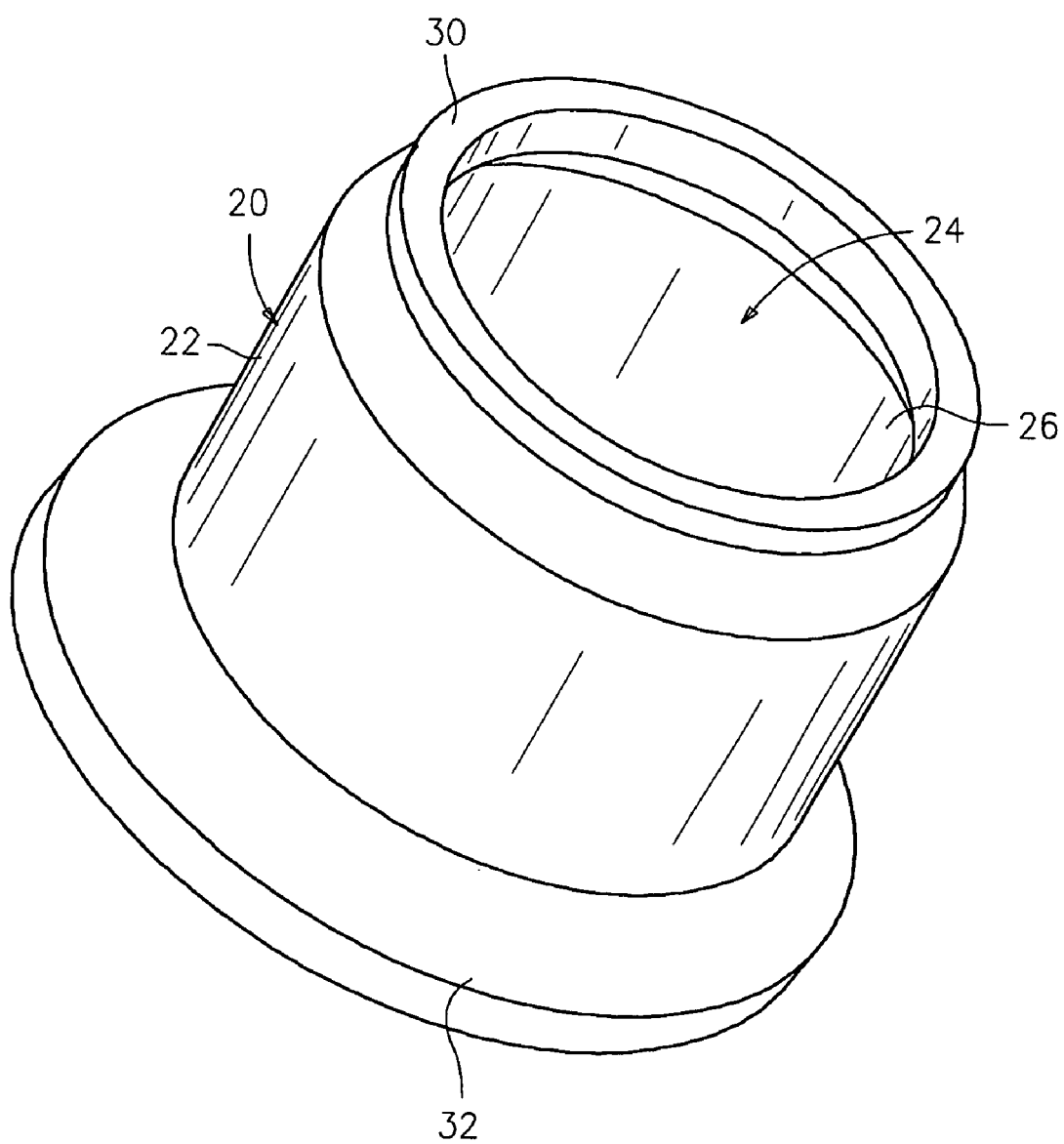
FIG. 3 is a perspective view of a weld housing for the feedthrough assembly of FIG. 2.
Figure 4:
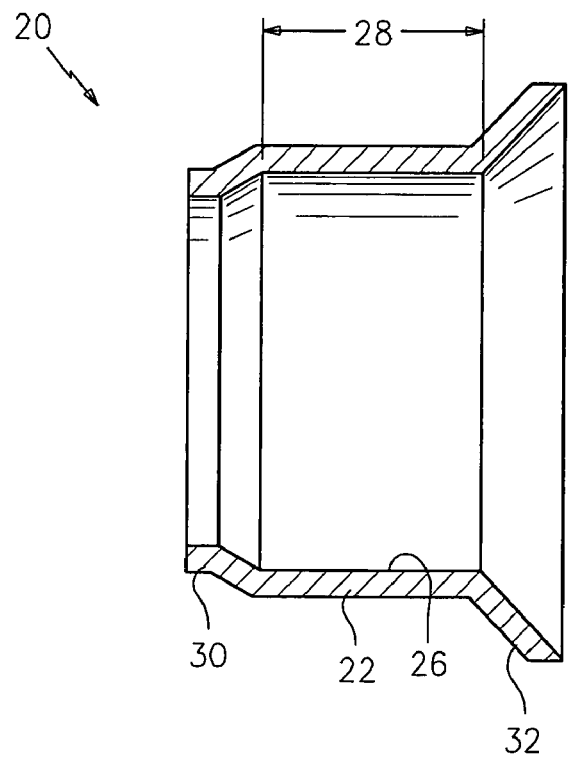
FIG. 4 is a side, cross-sectional view of the weld housing of FIG. 3.

Now referring to FIGS. 3 and 4, perspective and side cross-sectional views, respectively, of the weld housing 20 are shown. The weld housing 20 has a central portion 22 that defines an inner channel 24. The length 28 of the inner channel 24 is relatively longer than the thickness of a compressor shell and the bottom wall of a traditional metal collar. Thus, the inner channel 24 provides significantly more surface area 26 for the wire assembly 40 to seal against. The outer neck 30 of the weld housing 20 narrows such that even if dislodged, the wire assembly 40 would be retained against internal pressure of the compressor. The inner end 32 of the weld housing 30 expands in diameter. As a result, if the weld housing 20 were to become dislodged, the compressor shell would retain the weld housing 20 against internal compressor pressure. The weld housing 20 is welded into the opening in the compressor shell by the central portion 22 adjacent inner end 32.

For exemplary purposes only, the weld housing 20 is depicted as having a generally circular configuration. Those skilled in the art will readily appreciate however, that the subject disclosure is not limited to a weld housing having such a configuration. Indeed, it is envisioned and well within the scope of the subject disclosure that the weld housing could take form in any shape. Without limitation, such shapes could include a square, triangle, rectangle, oval as viewed from a side, from above, or from below. The weld housing 20 can be formed from various materials such as plastic and/or metals like, without limitation, brass, aluminum and steel.

Figure 5:
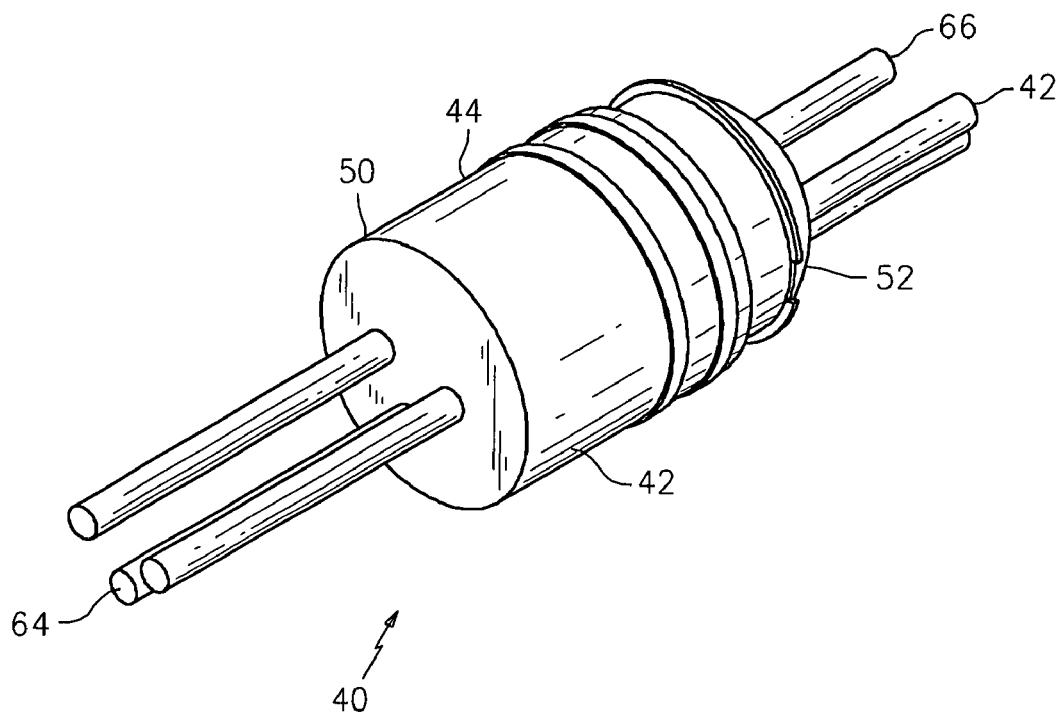
FIG. 5 is a perspective view of a sealed wire assembly for the compressor feedthrough assembly of FIG. 2, wherein the sealed wire assembly is ready to be inserted in a weld housing.
Figure 6:
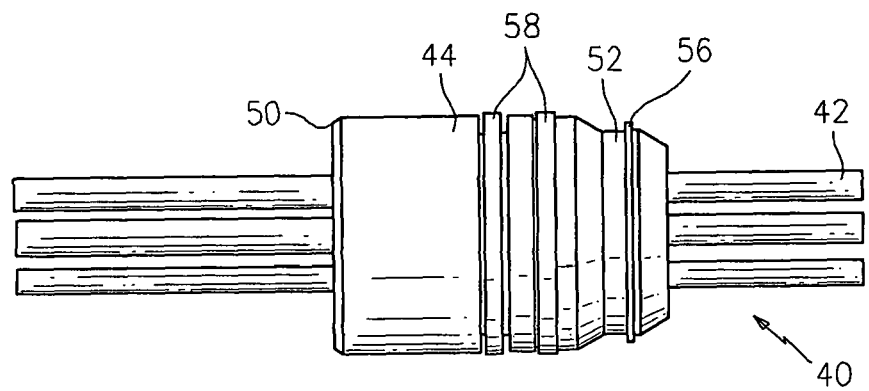
FIG. 6 is a side view of the sealed wire assembly of FIG. 5.

Referring now to FIGS. 5 and 6, perspective and side views, respectively, of the sealed wire assembly 40 are shown, wherein the wire assembly 40 is ready to be inserted into the weld housing 20. As best seen in FIGS. 2A and 2B, a body 44 of the wire assembly 40 is relatively longer than the weld housing 20 so that, when assembled, an inner portion 50 and an outer portion 52 of the body 44 extend from the weld housing 20. The outer portion 52 of the body 44 is shaped complimentarily to nestle within the outer neck 30 of the weld housing 20.

Figure 7:
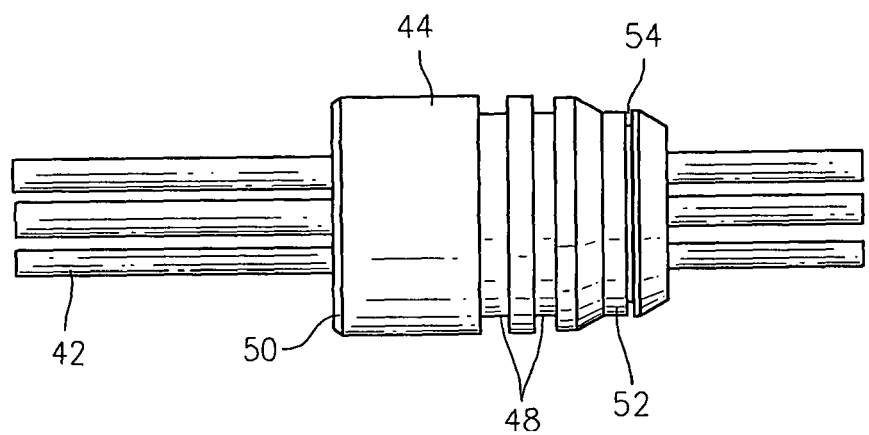
FIG. 7 is a side view of the sealed wire assembly of FIG. 5 with the o-rings and snap ring removed.
Figure 9:
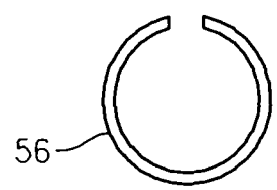
FIG. 9 is a plan view of a snap ring for use on the body of the sealed wire assembly of FIG. 5.
Figure 10:
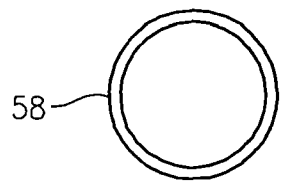
FIG. 10 is a plan view of an o-ring for use on the body of the sealed wire assembly of FIG. 5.

Referring now to FIG. 7, a side view of the sealed wire assembly of FIG. 5 with the snap ring 56 and o-rings 58 removed is shown. The outer portion 52 includes a slot 54 for receiving the snap ring 56 as shown in FIG. 9. When disposed in the slot 54, the snap ring 56 prevents the body 44 from moving inward in the weld housing 20. Preferably, the snap ring 56 is carbon steel with an oil dip coating or stainless steel. The outer surface 46 of the body 44 also defines two o-ring grooves 48 that are within the central portion 22 of the weld housing 20, when assembled. Each groove 48 receives an o-ring 58 (as shown in FIG. 10) to create a hermetic seal with the central portion 22. The o-rings 58 may be resiliently flexible material such as parker compound C8873-70 available from Parker-Hannifin Corp. of Cleveland, Ohio.

Figure 8:
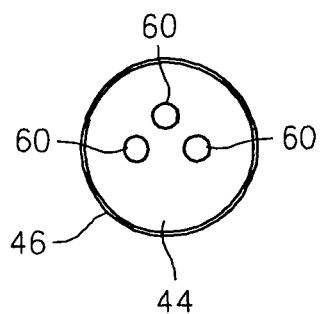
FIG. 8 is an end view of the sealed wire assembly of FIG. 5.

Referring now to FIGS. 6-8, the body 44 also defines three passages 60, each of which carries a wire 42. The wires 42 are effectively buried and fixed in the body passages 60 such that the seal around the wires is hermetic. The body 44 may be fabricated from a material such as an epoxy material, a ceramic material and the like.

To assemble the feedthrough assembly 10 in the shell of a compressor, an empty weld housing 20 is welded into an opening in the shell. The desired number of wires 42 are embedded in the body 44. The o-rings 58 are placed in the respective groove 48, then the inner ends 64 of the wires 42 are connected to the compressor components. The outer ends 66 of the wires 42 are routed through the weld housing 20. The body 44 is disposed within the weld housing 20 such that the o-rings 58 form a hermetic seal with the weld housing 20. To further secure the body 44 in the weld housing 20, the snap ring 56 clips into the slot 54.

It is envisioned that many techniques, now known and later developed, can successfully accomplish the hermetic seals required to practice the subject technology. For example, the weld housing 20 does not have to be welded to the shell, rather the weld housing 20 could be epoxied, glued, press-fit, form a groove that retains an o-ring or otherwise hermetically affixed within the opening. Similarly, the body 44 could be sealed with the weld housing 20 simply by being oversized and formed from a material that has sealing properties such that no o-rings are needed. This compression fit within the weld housing 20 could provide sealing pressure on the wire 42 as well. Epoxy, interference fits, glue and the like could also sealingly hold the body 44 in place.

The body 44 could also shaped to be held in place by outward pressure such that the snap ring is unnecessary. As can be seen, the body 44 can be easily replaced to include additional wires in the event that additional electrical connections are desired. In the case where the compressor shell is thick enough, the body 44 may be sized and configured to directly seal to the shell without a weld housing.

As would be appreciated by those of ordinary skill in the pertinent art, the subject technology is applicable to use as in any type of compressor with significant advantages for hermetically sealed portions thereof. The functions of several elements may, in alternative embodiments, be carried out by fewer elements, or a single element. Similarly, in some embodiments, any functional element may perform fewer, or different, operations than those described with respect to the illustrated embodiment. Also, functional elements shown as distinct for purposes of illustration may be incorporated within other functional elements, separated in different hardware or distributed in various ways in a particular implementation. Further, relative size and location are merely somewhat schematic and it is understood that not only the same but many other embodiments could have varying depictions.

INCORPORATION BY REFERENCE

All patents, published patent applications and other references disclosed herein are hereby expressly incorporated in their entireties by reference.

While the invention has been described with respect to preferred embodiments, those skilled in the art will readily appreciate that various changes and/or modifications can be made to the invention without departing from the spirit or scope of the invention as defined by the appended claims.

What is claimed is:

1. An electrical feedthrough assembly for providing connection to at least one component of a compressor, the electrical feedthrough assembly comprising:
    a housing having an inner surface defining a channel;
    a sealed wire assembly at least partially in the channel, the sealed wire assembly including:
        a substantially solid body having an outer surface defining a groove;
        at least one wire sealingly passing through the body;
        an o-ring disposed in the groove to provide a hermetic seal between the body and the inner surface of the housing; and
        a snap ring for coupling to a slot formed in the body to prevent the sealed wire assembly from moving axially in a first direction in the housing.

2. An electrical feedthrough assembly as recited in claim 1, wherein the housing has an outer surface adapted to be sealingly welded to a compressor shell.

3. An electrical feedthrough assembly as recited in claim 1, wherein the housing has an enlarged end and a narrowed end.

4. An electrical feedthrough assembly as recited in claim 1, further comprising a second o-ring disposed in a second groove formed in the body.

5. An electrical feedthrough assembly as recited in claim 1, wherein the at least one wire is four wires.

6. An electrical feedthrough assembly as recited in claim 1, wherein the body has a length greater than a length of the housing.

7. An electrical feedthrough assembly as recited in claim 6, wherein the body has a portion positioned outside the housing, the portion of the body positioned outside the housing being configured to receive an end portion of the housing to prevent the sealed wire assembly from moving axially in one direction in the housing.

8. An electrical feedthrough assembly as recited in claim 1, wherein the housing and sealed wire assembly being configured and positioned to substantially limit axial movement of the sealed wire assembly in the housing.

9. A compressor comprising:
    a shell defining an opening;
    a wire assembly hermetically sealed in the opening, the wire assembly including a substantially solid body and at least one wire passing through the body, the body being formed from a material that hermetically seals the at least one wire directly in the body without additional components and the body having an outer surface defining a groove; and
    the wire assembly comprising:
        a housing having an outer surface hermetically secured to the opening and an inner surface defining an elongated channel for receiving the body;
        an o-ring positioned in the groove to contact the elongated channel to form a hermetic seal; and
        a snap ring for coupling to a slot formed in the body to prevent the body from moving axially in the housing in a first direction.

10. A compressor as recited in claim 9, wherein the material is selected from the group consisting of epoxy, a ceramic and combination thereof.

11. A compressor as recited in claim 9, wherein the wire assembly is configured and positioned to substantially limit axial movement of the body relative to the shell.

12. A compressor as recited in claim 9, wherein the body has a length greater than a length of the housing.

13. A compressor as recited in claim 9, wherein the housing comprises a first end and a second end opposite the first end, the first end is positioned in the shell and has a diameter greater than the opening.

14. A compressor as recited in claim 13, wherein the elongated channel is positioned between the first end and the second end.

15. A compressor as recited in claim 14, wherein the body has a first portion positioned outside the second end of the housing, the first portion of the body being configured to receive the second end of the housing to prevent the sealed wire assembly from moving axially in a second direction in the housing opposite the first direction.

16. A compressor as recited in claim 15, wherein the slot is formed in the first portion of the body.

17. A method for electrically connecting components within a shell of a compressor, the method comprising:
    forming an opening in the shell;
    hermetically sealing a housing in the opening, the housing having an elongated inner surface defining a channel;
    embedding at least one wire in a body such that the at least one wire is hermetically sealed in the body to form a wire assembly;
    placing an o-ring in a respective groove in the body;
    connecting an end of the at least one wire to a component within the shell of the compressor;
    securing the wire assembly within the channel such that the housing is hermetically sealed about the wire assembly with the o-ring; and
    preventing the body from moving axially in the housing in a first direction by coupling a snap ring to a slot formed in the body.

* * * * *